Patented Mar. 30, 1954

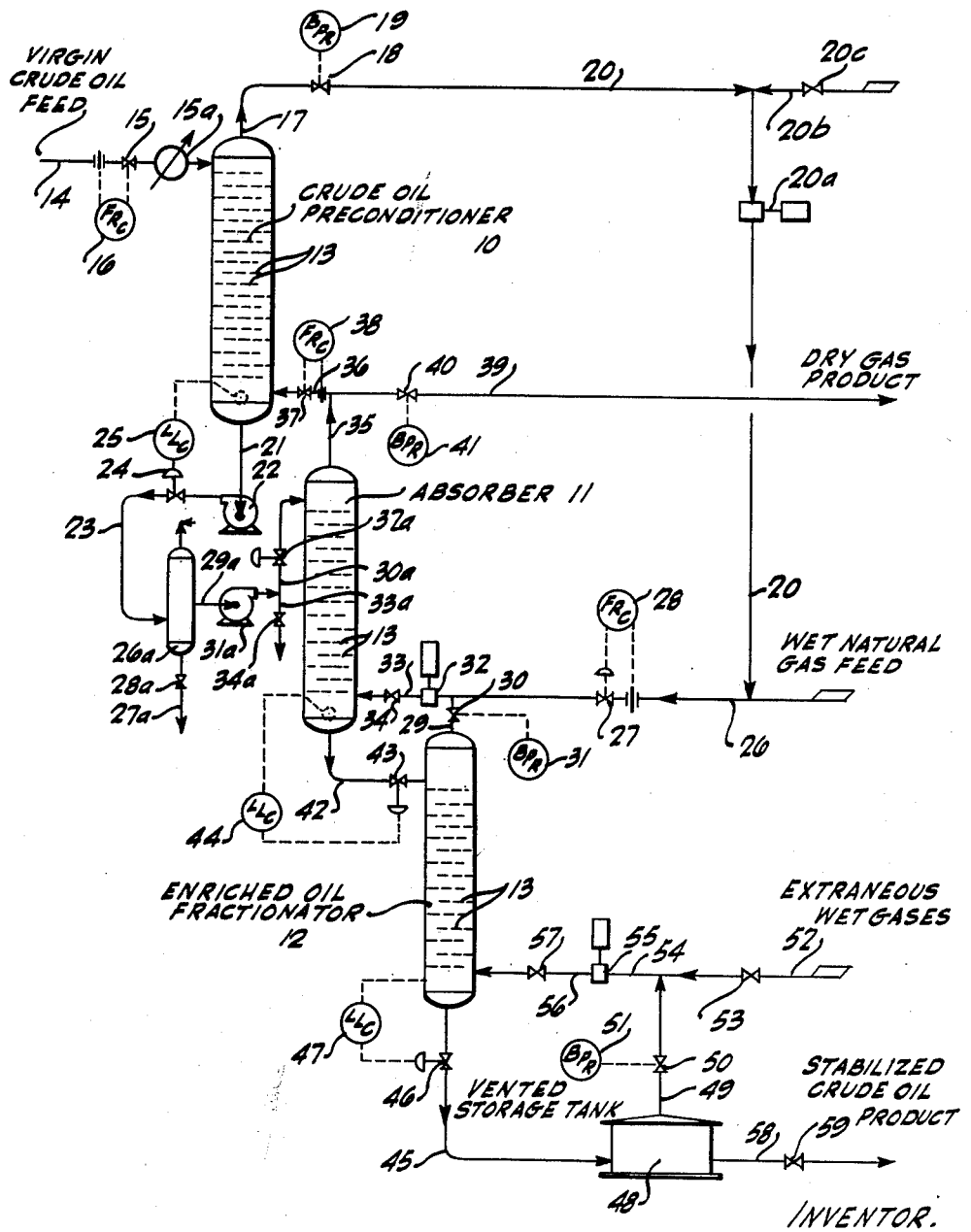

2,673,829

UNITED STATES PATENT OFFICE 2,673,829

HYDROCARBON OIL STABILIZATION PROCESS

Robert A. King, San Gabriel, Calif., assignor to Union Oil Company of California, Los Angeles, Calif., a corporation of California Application May 22, 1950, Serial No. 163,369

16 Claims. (Cl. 196—8)

This invention relates generally to the separation of gaseous mixtures and to the recovery of absorbed gases in liquid absorbents. In particular this invention relates to the absorption of desirable hydrocarbon constituents from wet natural gas using as an absorbent pretreated or conditioned crude petroleum. This invention further relates to a process and apparatus for the simultaneous stabilization of the unstable crude petroleum and for the recovery of higher molecular weight constituents from wet natural gas.

The treatment of wet natural gas to effect recovery of desirable hydrocarbon constituents, usually termed natural gasoline, has been carried out in a number of ways. These include contacting of the wet gas with a recirculating stream of absorption oil to effect solution of the higher molecular weight constituents followed by the heating and stripping of the rich absorption oil to recover the absorbed hydrocarbons. Another way includes the compression and cooling of natural gas to cause condensation of a portion of the mixture and the subsequent stabilization of the condensate. Natural gas has further been treated by solid granular adsorbents whereby the higher molecular weight natural gasoline hydrocarbons, being more readily adsorbable than the lower molecular weight constituents, are retained on the adsorbent and are subsequently removed therefrom by such desorption operations as heating, steam stripping, or a combination of both heating and stripping. In the latter operation the stripped natural gasoline and stripping steam is condensed and the two liquid phases separated by decantation.

Such operations as above named for the treatment of natural gas require considerable quantities of expensive equipment in the form of steam generation plants, many pumps and compressors, cooling facilities including a cooling tower for evaporative cooling the cooling water, as well as numerous heat interchangers, storage facilities for recovered gasoline, fired heaters, as well as operating labor and supervision, and the like. Consequently such natural gas treating operations are usually applied nearer the marketing areas in which the natural gasoline and natural gas may be easily disposed of or in remote areas where great quantities of hydrocarbons are recoverable thus justifying the expense of the installation.

In remote areas and in oil fields which produce relatively small quantities of crude petroleum and natural gas the installation of such extensive natural gas treating facilities is not justified since the quantity of materials recovered is considered insufficient to make such an investment economically worth while.

Another problem which is involved at points adjacent marketing areas is that of supplying such natural gas to the local utilities companies for their distribution. The natural gas they distribute has a heating value of about 1000 B. t. u.'s per standard cubic foot while the wet natural gas produced in crude petroleum production has a heating value substantially higher than this, of the order of 1200 to 1400 B. t. u.'s per cubic foot. The utilities companies experience difficulty in handling such gases in their distribution mains and consumers have difficulty in utilizing it in domestic appliances so that a prior treatment to remove the higher molecular weight hydrocarbons is required to lower the volumetric heating value.

For the foregoing reasons such wet natural gas is frequently flared or otherwise wasted since the value of the products does not justify the expenditure required to recover them.

The present invention therefore is directed to a process and apparatus which is simplified in construction and operation, inexpensive to construct and operate, involves no absorption or liberation of heat (an adiabatic process) and is particularly applicable to cases in which such wet natural gas is, by the ordinary conventional gas treating processes, only capable of being processed at a financial loss.

An object of the present invention is to provide an improved natural gas separation process.

A further object of the present invention is to provide a process for the recovery of $C_3$ and higher molecular weight hydrocarbons from hydrocarbon gases.

An additional object of the present invention is to provide a process for the stabilization of crude petroleum by the removal of absorbed low molecular weight hydrocarbon gases such as methane and ethane.

It is a particular object of this invention to provide an adiabatic process for the simultaneous recovery of desirable constituents from wet natural gas and the removal of low molecular weight hydrocarbons from unstabilized crude petroleum.

An additional object of this invention is to simultaneously treat wet natural gas and unstable crude petroleum for the mutual adiabatic exchange of desirable fractions thereof to produce a stable crude petroleum and a desirable dry natural gas.

It is also an object of this invention to provide an apparatus capable of effecting the aforementioned objects.

Other objects and advantages of this invention will become apparent to those skilled in the art as the description thereof proceeds.

Briefly, the present invention comprises a simplified process and apparatus for the treatment of hydrocarbon liquids and gases to effect an adiabatic transfer of the low molecular weight constituents from the liquid to the gas as well as a transfer of higher molecular weight constituents from the gas to the liquid. Specifically in the treatment of unstable crude petroleum with wet natural gas a transfer of $C_1$ and $C_2$ hydrocarbons absorbed in the crude petroleum to the gas phase is effected and at substantially the same time the higher molecular weight constituents undesirable in the gas phase are transferred into the liquid. This transfer is effected in three liquid-gas contacting steps through which the liquid phase is passed in sequence and subjected successively to a preconditioning operation, an absorption operation, and a fractionating operation. A dry gas product is produced from the second step and a stabilized liquid product is produced from the third step while a rich vapor is recycled from the conditioning step to the absorption step to assist in increasing the efficiency of the operation.

Applied specifically to the treatment of crude oil and wet natural gas, the $C_1$ and $C_2$ hydrocarbons are separated from the unstable crude and injected into the gas phase while the $C_3$ and higher molecular weight natural gasoline hydrocarbons are dissolved from the natural gas stream into the crude petroleum. A gas is produced from the process consisting predominantly of methane and ethane while the liquid stabilized crude petroleum phase produced contains $C_3$ and higher molecular weight hydrocarbons.

The primary advantages of the present invention are, as will subsequently appear, the elimination of the usually required facilities for steam generation, recirculation of absorption oil, and the heating or cooling of any of the gas or liquid streams. The entire energy of separation in the present invention is obtained from the pressuring and depressuring of the gas to be treated.

In the process of the present invention the unstable crude petroleum feed, saturated with methane and ethane and other natural gas constituents, is first countercurrently contacted with a dry gas consisting essentially of methane and ethane whereby an appreciable quantity of $C_3$, $C_4$, $C_5$ and higher molecular weight hydrocarbons are removed from the crude oil as a recycle vapor. The thus conditioned crude petroleum is then contacted at an elevated pressure with the wet natural gas feed combined with the recycle vapor. Although some absorption processes indicate recycle of such stripped vapors to a reabsorber, it is preferred to recycle them in this case to the absorber. A substantially complete absorption of the $C_3$ and higher molecular weight hydrocarbons present in the combined feed gas is effected thereby producing a rich crude petroleum and a dry gas product. The dry gas fraction thus produced consists essentially of methane and ethane and is substantially free of $C_3$ and higher molecular weight hydrocarbons. The rich crude petroleum removed from the bottom of the absorber contains substantially all of the $C_3$ and higher molecular weight components of the wet natural gas as well as being saturated at the conditions of pressure and temperature of the absorber with methane and ethane. The rich crude petroleum is then passed to the third or fractionation step in which it is contacted by a mixture of rich gas vapor containing a considerable proportion of $C_3$ and higher molecular weight hydrocarbon constituents. Through this contact in the third step the methane and ethane present in the rich crude petroleum are preferentially displaced by the $C_3$ and higher molecular weight hydrocarbon constituents in the rich vapor which is substantially free of methane and ethane. The methane and ethane thus displaced is returned with the wet natural gas feed to the absorber and the enriched and partially stabilized crude petroleum produced in the fractionating step is passed to a vented storage tank from which the stabilized crude oil product is removed for transportation by pipe line or tank truck to refineries or other subsequent processing. Vapors removed from the vented storage tanks as well as other extraneous wet vapors when available are passed into the fractionator to effect the methane and ethane displacement referred to above.

A more complete understanding of the process of the present invention and the three separate process operations involved therein will be more apparent by the following description of the accompanying drawing.

As shown in the drawing the apparatus comprises three contacting columns, namely, conditioner 10, absorber 11 and fractionator 12. These vessels are adapted for the countercurrent contact of a liquid and a gaseous fluid and may be provided therefore with any variety of conventional column packing such as Berl saddles, Raschig rings, or various types of crushed solids. Preferably, however, the columns are provided with trays 13 which may be of the perforated or bubble cap type. The liquid flows downwardly successively across the trays while the gas bubbles up through the trays in countercurrent contact with the liquid.

The virgin crude petroleum feed (it may be dehydrated), is introduced via line 14 at a rate controlled by valve 15 in accordance with flow recorder controller 16 through optional interchanger 15a described below on to the top tray of stripper 10 in which it flows downwardly countercurrent to an ascending stripping gas. During this passage the stripping gas causes the vaporization or release of $C_3$–$C_5$ and some higher molecular weight hydrocarbon gases dissolved in the unstabilized crude petroleum. The thus vaporized constituents together with the stripping gas pass from the top of preconditioner 10 via line 17 at a rate controlled by valve 18 in accordance with back pressure regulator 19. The gas thus removed is a recycle gas or vapor which is recycled as subsequently described via line 20 and compressor 20a to absorber 11 described below. In a less preferred modification applicable in special cases where this vapor is very rich the recirculation may be to the bottom of fractionator 12. The crude petroleum accumulating in the bottom of conditioner 10 is a conditioned oil substantially free of $C_3$, $C_4$ and $C_5$ hydrocarbon components but saturated at the conditions of contact with dry stripping gas.

In one manner of operation the conditioned oil is withdrawn from the bottom of conditioner 10 via line 21 and is pumped by means of pump 22 through line 23 into separator 26a at a rate controlled by valve 24 in accordance with liquid level controller 25 which maintains a liquid level in the bottom of stripper 10. Water is removed via line 27a controlled by valve 28a. Dried conditioned oil is then pumped via lines 29a and 30a and pump 31a controlled by valve 32a into the top of absorber 11. Means are provided, line 33a controlled by valve 34a, for passing all or a portion of the conditioned oil to storage from which it may be returned to absorber 11 or combined with the enriched product oil if desired.

In a modification, the virgin crude petroleum may be allowed to settle and drop out water prior to treating it in preconditioner 10 in which case the conditioned oil flowing from conditioner 10 passes directly via pump 22 into absorber 11.

The conditioned oil introduced into absorber 11 passes downwardly successively over trays 13 in absorber 11 in countercurrent contact with the feed gas. The wet natural gas is introduced via line 26 at a rate controlled by valve 27 in accordance with flow recorder controller 28. It is combined with a desorbed gas discharged via line 29 from fractionator 12 at a rate controlled by valve 30 in accordance with back pressure regulator 31, with recycle gas from conditioner 10 and with extraneous gases from the oil field operation via line 20b and valve 20c. The feed gas mixture thus formed is compressed if necessary to the absorption pressure by means of compressor 32 and conveyed via line 33 at a rate controlled by valve 34 into the bottom of absorber 11. Dissipation of the heat of compression is not necessary, but may conveniently be effected by passing the gas through exchanger 15a described above. The increase in virgin crude petroleum temperature does assist the preconditioning step in vessel 10. The compressed feed gas countercurrently contacts the downwardly flowing conditioned crude petroleum and the $C_3$ and higher molecular weight hydrocarbons from the compressed feed are absorbed forming a rich crude petroleum and leaving a dry gas product. The latter gas consists essentially of methane and ethane and is removed from the upper part of absorber 11 via line 35. The stream is then split into a minor portion and a major portion. The minor portion passes via line 36 at a rate controlled by valve 37 in accordance with flow recorder controller 38 as a dry stripping gas into the bottom of conditioner 10. The major portion passes via line 39 at a rate controlled by valve 40 and back pressure regulator 41 and is removed from the system as a dry gas product substantially free of $C_3$ and higher molecular weight hydrocarbon constituents. The heating value of this product is such that it is suitable for direct introduction into the distribution mains of gas utilities companies without further treatment to be used as industrial or domestic fuel, or to be used as feed stock in the various natural gas chemical conversion processes such as acetylene and ethylene production.

Substantially all of the $C_3$ and higher molecular weight hydrocarbon constituents present in the gas feed of absorber 11 as well as some of the methane and ethane are absorbed in the crude petroleum flowing downwardly through the absorber. The rich crude petroleum thus formed flows from the bottom of absorber 11 via line 42 at a rate controlled by valve 43 in accordance with liquid level controller 44 which maintains a liquid level in the bottom of absorber 11. The rich crude petroleum thus introduced passes downwardly across the trays 13 of fractionator 12 in countercurrent contact with an ascending gaseous stream of rich vapors containing substantial quantities of $C_3$–$C_5$ and higher molecular weight hydrocarbon constituents but substantially free of methane and ethane which rich vapors are vented from the stabilized crude oil product at a lower pressure. The countercurrent contact thus effected results in the preferential displacement of the absorbed methane and ethane in the rich crude petroleum and the absorption of the $C_3$ and higher molecular weight constituents of the rich vapor. Thus, the residual methane and ethane present in the rich petroleum removed from absorber 11 (because it is in equilibrium with wet natural gas feed containing methane and ethane) are fractionated and displaced from the fluid in fractionator 12 and replaced by the higher molecular weight constituents of the rich vapor desirably present in the liquid phase. Under proper operating conditions the rich vapor contains no methane or ethane. However, such traces of these compounds which do sometimes occur pass directly through fractionator 12 and are reintroduced via lines 29 and 33 into absorber 11 whereby residual $C_3$ and higher molecular weight hydrocarbons carried from fractionator 12 are recovered.

The enriched stabilized crude petroleum formed from the rich crude petroleum accumulates in the lower part of the fractionator and is conveyed via line 45 at a rate controlled by valve 46 in accordance with liquid level controller 47 to vented stabilized crude petroleum product tank 48, preferably operated at near atmospheric pressure. The vapors which may be evolved from vent tank 48 are removed therefrom via line 49 at a rate controlled by valve 50 in accordance with back pressure regulator 51. These vapors sometimes contain a minor proportion of methane and ethane but normally are exclusively volatile higher molecular weight hydrocarbons. This vent gas may be combined with other extraneous wet gases or rich vapors from other sources when available flowing through line 52 at a rate controlled by valve 53 and passes via line 54 into compressor 55 wherein the pressure is raised sufficiently to return the gas to fractionator 12 via line 56 at a rate controlled by valve 57. From storage tank 48 a stabilized crude oil product is removed via line 58 at a rate controlled by valve 59 and is suitable for conveyance in trucks or via pipe line to the nearest petroleum refinery. The product thus produced contains all the constituents of crude petroleum which are normally handled in the usual petroleum refinery processes, namely, the $C_3$ and higher molecular weight hydrocarbons and is substantially free of methane and ethane. The methane and ethane originating as natural gas with the crude petroleum from oil wells is hereby separated in a form substantially free of $C_3$ and higher molecular weight hydrocarbons and is suitable for direct introduction into fuel gas pipe lines for distribution to consumers.

From the foregoing description and illustration it is apparent that a simplified process and apparatus is described for the adiabatic treating of the various gaseous and liquid products produced from crude petroleum wells. It is further apparent that no heat is absorbed or removed from the process and an absolute minimum of energy is required to effect the operation. One of the foremost characteristics of the process of the present invention is complete absence of the utilization of energy in the form of heat, none of the gas streams or liquid streams being heated or cooled to effect the separation.

In the normal operation of the process of this invention, it is desirable that the pressure under which the conditioned oil and the wet gas feed are contacted in absorber 11 be greater than the pressure existing in either conditioner 10 or fractionator 12. It is preferred that the operating pressure of conditioner 10 be subatmospheric and as low as possible but it may be in the range of from about 1 to about 15 pounds per square inch absolute with pressures of 5 to 10 pounds absolute desirable. In one manner of operation fractionator 12 is operated at a pressure less than absorber 11 but greater than conditioner 10, a range of from about 20 to 100 pounds per square inch absolute being satisfactory. The operating pressure of absorber 11 may range between about atmospheric pressure to as high as 2000 pounds per square inch. In the treatment of virgin crude petroleum and wet natural gas feed absorber operating pressures in the range of 100 pounds per square inch to 1000 pounds per square inch have been found to be desirable. It was first thought that an absorber pressure of about 400 p. s. i. g. would be required for production of a sufficiently dry gas for public utility distribution (i. e. $C_3$-free) but in actual operation of the present invention it was later found that this could be effected at 200 p. s. i. g. In any event the operating pressure of the absorber is preferably greater than those of the other two contacting vessels employed in the process, and that of preconditioner is preferably as low as possible.

Another characteristic of the process of the present invention is that the temperatures of the liquid streams and of the gas streams are substantially constant at all points in the process with the exception of the temperature of the gas stream following compression. In outlying regions it is desirable to employ air cooled coolers for the dissipation of the heat of compression thus eliminating the otherwise small requirement of cooling water. If cooling water is available water cooled compressors may be employed.

The process of the present invention as described produces a remarkably complete separation of the methane and ethane from the other hydrocarbons produced in crude oil production. Futrhermore, the process as described is substantially self operating, requiring practically no operating labor or supervision largely because of the elimination of the heating and steam generation operations normally used in natural gasoline recovery.

To illustrate the efficiency with which wet natural gas and unstable crude petroleum are treated, the following example is given:

EXAMPLE

In a southern California oil field located near La Habra, natural gas was treated with crude petroleum in a manner according to the present invention in an apparatus maintained in an isolated location approximately 15 miles from the nearest absorption plant. The gas separated from the crude petroleum production has a gross heating value of 1233 B. t. u.'s per cubic foot, considerably in excess of the value acceptable for direct introduction into the lines of a local utilities company.

Virgin unstable crude petroleum was passed through a conditioning column forming a conditioned crude which was introduced at a rate of 754 barrels per day into the absorber in contact with 511 M. C. F. per day of an absorber intake gas having the following composition:

Table 1.—Absorber feed

| Component: | Mol per cent |
|---|---|
| $H_2O$, $CO_2$ and air | 5.70 |
| Methane | 69.41 |
| Ethane | 9.42 |
| Propane | 10.06 |
| Isobutane | 1.58 |
| Normal butane | 1.93 |
| Isopentane and heavier | 1.90 |
| | 100.00 |

The dry gas produced from the absorber amounted to 386 M. C. F. per day and had the following composition:

Table 2.—Dry gas product

| Component: | Mol per cent |
|---|---|
| Water vapor, $CO_2$ and air | 5.60 |
| Methane | 85.91 |
| Ethane | 6.74 |
| Propane | 1.02 |
| Isobutane | 0.17 |
| Normal butane | 0.24 |
| Isopentane and heavier | 0.32 |
| | 100.00 |

This dry gas had a heating value of 1065 B. t. u.'s per cubic foot and was introduced into the distribution lines of a gas utilities company. A portion amounting to 31 M. C. F. of dry gas was introduced into the bottom of the crude petroleum conditioner from which was removed 69 M. C. F. per day of recycle gas having the following composition:

Table 3.—Recycle gas

| Component: | Mol per cent |
|---|---|
| $H_2O$, $CO_2$ and air | 6.4 |
| Methane | 61.58 |
| Ethane | 10.00 |
| Propane | 11.59 |
| Isobutane | 2.71 |
| Normal butane | 3.92 |
| Isopentane and heavier | 3.80 |
| | 100.00 |

The rich oil from the absorber was introduced directly into the fractionation zone wherein it was countercurrently contacted by 41 M. C. F. per day of a rich gas recycle having the following composition:

Table 4.—Rich vapors

| Component: | Mol per cent |
|---|---|
| $H_2O$, $CO_2$ and air | 5.30 |
| Methane | 3.42 |
| Ethane | 12.24 |
| Propane | 57.01 |
| Isobutane | 7.80 |
| Normal butane | 8.14 |
| Isopentane and heavier | 6.09 |
| | 100.00 |

The overhead gas from the fractionation zone flowed at a rate of 99 M. C. F. per day and had the following composition:

*Table 5.—Deabsorbed gas*

| Component: | Mol per cent |
|---|---|
| $H_2O$, $CO_2$ and air | 6.3 |
| Methane | 29.67 |
| Ethane | 21.53 |
| Propane | 32.61 |
| Isobutane | 3.57 |
| Normal butane | 3.57 |
| Isopentane and heavier | 2.75 |
| | 100.00 |

This gas was combined with the conditioner overhead gas and the natural gas feed to form the absorber feed.

The absorber was operated at a pressure of 250 pounds per square inch gauge, the crude petroleum conditioner was operated at a value of 5 inches of mercury vacuum and the fractionator was operated at 25 pounds per square inch gauge. The compressed feed gas to the absorber was not cooled but was introduced at 166° F. The temperatures of all the streams with the exception of the one named were less than 95° F. The heating value of dry gas from the absorber was 1065 B. t. u.'s per cubic foot and was directly introduced into utility gas lines. The propane recovery was 92+% which is unusually high for an absorption plant operating at 250 pounds per square inch gauge pressure.

In the method of the present invention for the production of a dry gas product substantially free of $C_3$ and heavier hydrocarbons and a stabilized crude product substantially free of $C_2$ and $C_1$ hydrocarbons, a conditioned crude petroleum to gas feed ratio in the absorber varying between about 40 and 15 gallons per M. C. F. is required for absorption pressure ranging respectively from about 200 to about 500 pounds per square inch gauge.

In the example and description given above a separation between $C_2$ and $C_3$ hydrocarbons was effected. By increasing the pressure of absorption and the absorbent to feed gas ratio it is possible to separate ethane and heavier hydrocarbons from methane and to produce a crude petroleum product containing dissolved ethane and substantially free of methane. Similarly with a lower oil to feed gas ratio or a lower absorption pressure or both, it is possible to produce $C_3$ and lighter hydrocarbons as a dry gas product and the $C_4$ and heavier hydrocarbons along with the stabilized crude petroleum. However, for the purposes described it is generally preferable to produce a dry gas product comprising essentially methane and ethane.

The foregoing example illustrates that a desirable separation of the higher molecular weight hydrocarbons may be made adiabatically from the methane and ethane present in the natural gas produced with crude petroleum and with a minimum of energy input. Although the process and apparatus of the present invention is primarily applicable to the processing or treating of unstable crude petroleum and wet natural gas in the field at points remote from the other customary oil refining operations, it is to be understood, however, that the same process steps may be carried out within the limits of a petroleum refinery whereby wet hydrocarbon gases containing normally liquid or other constituents desirably recovered such as $C_3$–$C_5$ and higher molecular weight components may be treated in the manner described by contacting with hydrocarbon oils containing constituents which are volatile at atmospheric pressure such as the $C_1$–$C_5$ saturated and unsaturated hydrocarbons, thus effecting a similar transfer of hydrocarbons between the gas and the liquid phases without departing from the principles of the present invention.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process which comprises establishing a preconditioning zone, an absorption zone, and a fractionating zone, introducing unstabilized crude petroleum into said preconditioning zone, separating natural gas and natural gasoline constituents therein at a relatively low pressure from said crude petroleum by means of a low molecular weight stripping gas forming a recycle gas of higher molecular weight and a preconditioned crude petroleum, countercurrently contacting said preconditioned crude petroleum in said absorption zone with a wet natural gas at a relatively high pressure forming a rich crude petroleum and a dry gas, passing said rich crude petroleum through said fractionation zone countercurrent to vapors rich in natural gasoline constituents at a relatively intermediate pressure forming a stabilized crude petroleum and a desorbed gas, separating said vapor rich in natural gasoline constituents from said stable crude petroleum, and returning said vapor to said fractionation zone.

2. A process according to claim 1 wherein the contacting operations in said preconditioning, absorption and fractionation zones are conducted adiabatically.

3. A process according to claim 1 including the step of passing a portion of said dry gas through said preconditioning zone as said low molecular weight stripping gas.

4. A process according to claim 3 wherein said recycle gas removed from said preconditioning zone is combined with said wet natural gas and introduced into said absorption zone.

5. A process according to claim 4 including the step of depressuring said stabilized crude petroleum from said fractionation zone into a storage zone and removing said vapors rich in natural gasoline constituents therefrom.

6. A process according to claim 5 including the step of passing said desorbed gas from said fractionation zone with said wet natural gas into said absorption zone.

7. A process according to claim 1 including the step of separating water from said unstabilized crude petroleum prior to introduction into said preconditioning zone.

8. A process according to claim 1 in combination with the steps of passing unstabilized crude petroleum containing water through said preconditioning zone and subsequently separating water from the preconditioned crude petroleum thus formed prior to introduction into said absorption zone.

9. A process which comprises passing virgin unstabilized crude petroleum through a preconditioning zone, separating $C_3$ to $C_5$ and some higher molecular weight hydrocarbons therefrom by countercurrent contact with a lower molecular weight gas rich in $C_1$ and $C_2$ hydrocarbons at a relatively low pressure forming a conditioned crude petroleum and a recycle gas, passing the preconditioned crude petroleum subsequently through an absorption zone, countercurrently contacting the preconditioned crude petroleum therein with wet natural gas at a relatively high pressure forming a rich crude petroleum and a dry gas, subsequently passing said rich crude petroleum through a fractionation zone, countercurrently contacting said rich crude petroleum therein with a rich vapor rich in $C_3$–$C_5$ hydrocarbons at a relatively intermediate pressure thereby forming a substantially stabilized crude petroleum substantially free of methane and ethane and a desorbed gas consisting essentially of methane and ethane, subsequently depressuring said substantially stabilized crude petroleum into a storage zone, passing vapors evolved therefrom and rich in $C_3$–$C_5$ and higher molecular weight hydrocarbons but substantially free of methane and ethane into said fractionation zone as said rich vapor and effecting the operations in said preconditioning, absorption, and fractionation zones adiabatically.

10. A process according to claim 9 including the step of combining said recycle gas from said preconditioning zone and said desorbed gas from said fractionation zone with said wet natural gas, compressing the mixture thus formed and introducing it into said absorption zone.

11. A process according to claim 10 in combination with the step of bringing the compressed mixture into heat interchange relation with said unstabilized crude petroleum to form a cooled mixed absorber feed gas and warmed unstable crude petroleum.

12. A process according to claim 9 wherein a portion of said dry gas is passed as a stripping agent through said preconditioning zone countercurrent to said unstable crude petroleum therein.

13. A process according to claim 9 wherein said preconditioning zone is maintained at a relatively low pressure of between about 1 and 15 pounds per square inch absolute, said absorption zone is maintained at a relatively high pressure of between about 100 and about 1,000 pounds per square inch absolute, and said fractionating zone is maintained at a relatively intermediate pressure of between about 20 and about 100 pounds per square inch absolute.

14. A process which comprises establishing a preconditioning zone, an absorption zone, and a fractionation zone, passing a hydrocarbon oil containing absorbed volatile hydrocarbon constituents through said preconditioning zone, stripping, by means of a low molecular weight dry gas, a recycle gas of higher molecular weight containing said volatile constituents from said hydrocarbon oil at a relatively low pressure leaving a preconditioned hydrocarbon oil, passing such oil without heat exchange into and through said absorption zone in countercurrent contact with a wet hydrocarbon gas at a relatively high pressure forming a dry gas and a rich hydrocarbon oil, passing said rich hydrocarbon oil without heat exchange into said fractionation zone, subsequently contacting said rich hydrocarbon oil in said fractionation zone with a volatile hydrocarbon rich vapor substantially free of dry gas components at a relatively intermediate pressure forming a desorbed gas and a stabilized hydrocarbon oil, passing said desorbed gas into said absorption zone and adiabatically conducting the vapor-liquid contacts in said preconditioning, absorption and fractionation zones.

15. A process which comprises establishing a preconditioning zone, an absorption zone and a fractionation zone, introducing unstabilized crude petroleum into said preconditioning zone, separating natural gas and natural gasoline constituents from said unstabilized crude petroleum forming a recycle gas and a preconditioned crude petroleum, combining said recycle gas with a wet natural gas to form a feed gas mixture, countercurrently contacting said preconditioned crude petroleum in said absorption zone with said feed gas mixture forming a rich crude petroleum and a dry gas, passing part of said dry gas countercurrently through said preconditioning zone, passing said rich crude petroleum through said fractionation zone countercurrent to vapor rich in natural gasoline constituents at a pressure greater than that of said preconditioning zone and at a pressure less than that of said absorption zone forming a stabilized crude petroleum and a desorbed gas, separating said vapor rich in natural gasoline constituents from said stabilized crude petroleum and returning said vapor to said fractionation zone.

16. A process which comprises passing virgin unstabilized crude petroleum through a preconditioning zone, separating $C_3$ to $C_5$ and some higher molecular weight hydrocarbons therefrom forming a preconditioned crude petroleum and a recycle gas, passing the preconditioned crude petroleum subsequently through an absorption zone, combining said recycle gas with wet natural gas to form a mixed gas feed, compressing said mixed gas feed, bringing the compressed mixed gas feed into indirect heat exchange relation with said unstabilized crude petroleum prior to its introduction into said preconditioning zone, countercurrently contacting the preconditioned crude petroleum therein with the mixed gas feed forming a rich crude petroleum and a dry gas, subsequently passing said rich crude petroleum through a fractionation zone, countercurrently contacting said rich crude petroleum therein with a rich vapor rich in $C_3$–$C_5$ hydrocarbons thereby forming a stabilized crude petroleum substantially free of methane and ethane and a desorbed gas consisting essentially of methane and ethane, subsequently depressuring said stabilized crude petroleum into a storage zone, passing vapors evolved therefrom and rich in $C_3$–$C_5$ and higher molecular weight hydrocarbons but substantially free of methane and ethane into said fractionation zone as said rich vapor and effecting the operations in said preconditioning, absorption, and fractionation zones adiabatically.

ROBERT A. KING.

References Cited in the file of this patent

UNITED STATES PATENTS

| Number | Name | Date |
|---|---|---|
| 2,038,314 | Ragatz | Apr. 21, 1936 |
| 2,249,884 | Carney | July 22, 1941 |
| 2,296,992 | Gary | Sept. 29, 1942 |
| 2,303,609 | Carney | Dec. 1, 1942 |
| 2,307,024 | Carney | Jan. 5, 1943 |
| 2,315,843 | Grennan et al. | Apr. 6, 1943 |
| 2,322,635 | Keith | June 22, 1943 |
| 2,345,934 | Gregory | Apr. 14, 1944 |